Aug. 21, 1934.  W. E. FIELD  1,971,000
FISHING LINE HOLDER AND DRIER
Filed Feb. 6, 1934
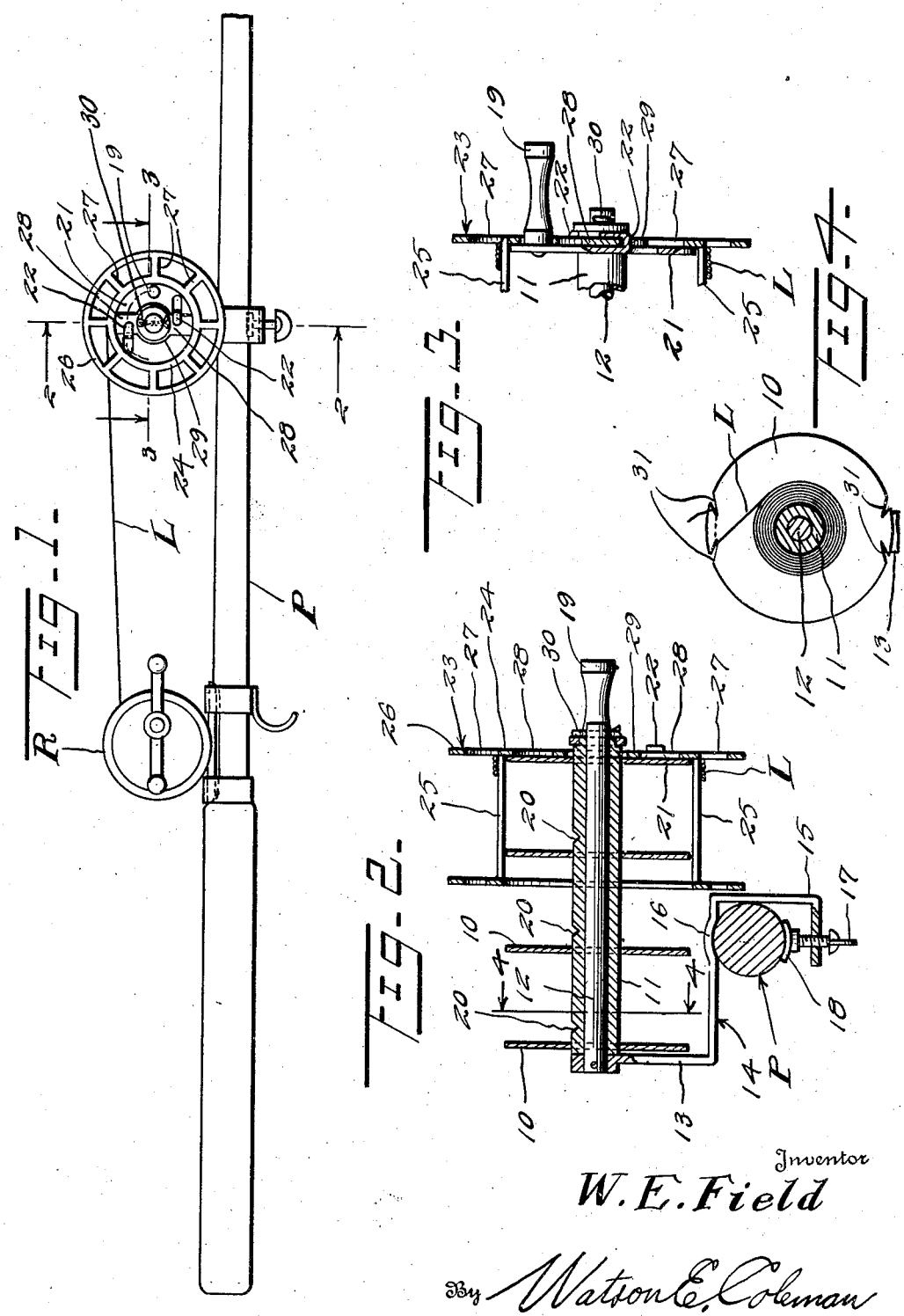
Inventor
W. E. Field
By Watson E. Coleman
Attorney Patented Aug. 21, 1934

1,971,000

UNITED STATES PATENT OFFICE 1,971,000

FISHING LINE HOLDER AND DRIER

Wadsworth E. Field, Aberdeen, Wash.

Application February 6, 1934, Serial No. 710,028

3 Claims. (Cl. 242—84.1)

This invention relates to fish lines and more particularly to a fish line holder and drying means.

An object of this invention is to provide an improved fish line holder and drier which is adapted to be releasably engaged with a fishing pole in advance or forwardly of the reel so that the fish line on the reel can be interchanged with a line on the holder and the line taken off the reel can be wound on a drying reel or drum so that the wet line will dry slowly and in a manner not to injure the line as is the case where the line is removed from the reel and strung on supports or the like.

Another object of this invention is to provide an improved drying means in combination with a holder and winding means whereby the drier can be readily detachably engaged with the winding means and operated thereby.

The above and various other objects and advantages of this invention will in part be described and in part be understood from the following detailed description of the present preferred embodiment, the same being illustrated in the accompanying drawing wherein:—

Figure 1 is a detail side elevation of a device constructed according to the preferred embodiment of this invention mounted on a fishing pole which is shown in fragmentary form.

Figure 2 is an enlarged sectional view taken on the line 2—2 of Figure 1.

Figure 3 is a fragmentary sectional view taken on the line 3—3 of Figure 1.

Figure 4 is a sectional view taken on the line 4—4 of Figure 2.

Referring to the drawing wherein like numerals of reference designate corresponding parts throughout the several views, the letter P designates generally a conventional fishing pole which has mounted thereon a reel R of conventional construction. The reel R has a line L wound thereon and in order to provide a means whereby a different line L may be wound on the reel R or the line L may be dried by a relatively slow drying process without causing the line L to twist or become knotted, I have provided a line holder and drying means which is adapted to be mounted on the pole P forwardly or in advance of the reel R, as shown in Figure 1 of the drawing.

This device comprises a line holder in the form of a plurality of disks 10 which are secured to a hollow shaft or sleeve 11. This sleeve 11 is rotatably mounted on a shaft 12 carried by an upstanding arm 13. The arm 13 has secured to or integral therewith a substantially U-shaped clamping means, generally designated as 14, which includes a U-shaped member 15 having an offset portion 16 on one side thereof and a threaded clamping member 17 provided with a swiveled head 18 which engages the side of the pole diametrically opposite to the offset portion 16. The clamping member 14, together with the arm 13, is adapted to hold the spool or reel structure 10 in upwardly offset relation to the pole P.

Any desired number of disks can be mounted on the hollow shaft 11 so that different kinds including lengths and sizes of lines may be wound separately on the spool structure and preferably, one space is left empty or vacant so that the line disposed on the reel R may be removed therefrom and placed on the holder after which a different line may be reeled onto the reel R.

A crank or handle 19 is secured to the outermost of the disks 10 which are mounted on the hollow shaft 11, and this handle provides a means for conveniently turning the spool structure so as to wind the desired line thereupon. Preferably, between each pair of disks 10, the hollow shaft 11 is provided with V-shaped slot 20 so that the line at one end may be knotted and the knot placed in the slot 20 for facilitating the winding of the line between pairs of disks 10.

The outermost disk 21 is provided with a pair of L-shaped lugs 22 which extend outwardly of one side thereof, and these lugs 22 are disposed in opposed relation one on each side of the center of the disk or plate 21. A line drying reel or drum, generally designated as 23, is adapted to be detachably engaged with the line winding or spool structure comprising the plates 10 and the hollow shaft 11.

This line drying member 23 comprises a pair of inner rings 24 which are held in spaced relation to each other by means of spacing members 25, which spacing members 25 constitute the inside of the winding drum or member 23, and these members 25 are preferably spaced from the center of the drum 23 a distance such that they will loosely engage over the peripheral edges of at least two of the disks mounted on the hollow shaft 11. These disks hold the drum member 23 concentrically of the shaft 11. A pair of outer rings 26 are secured one to each inner ring 24 by means of a plurality of radially arranged spokes or spacing members 27. In this manner, the drying member 23 will be constructed as a perforate member through which the air can readily pass so that the line wound about the drum will readily dry.

A bar 28 is secured to one side of the drum or line holding member 23 diametrically of the inner ring 24 and is provided in the center thereof with a ring-shaped member or loop 29 which is adapted to loosely engage about the outer end of the hollow shaft 11. The bar 28 is adapted to engage beneath the opposed lugs 22 which are positioned in a manner whereby upon turning of the handle 19 in a forward direction, the drying member 23 will also be turned so that the line L can be wound thereupon.

The hollow shaft 11 is held against longitudinal movement on the fixed shaft 12 by means of a securing member in the form of a cotter pin 30 or the like.

In the use and operation of the line holding member and drying means herein disclosed, when it is desired to transfer or interchange a line disposed on the reel R, the frame including the clamping member 14 and the arm 13 is clamped onto the pole P forwardly of the reel R and one of the empty spaces between a pair of plates 10 is used for receiving the line L which is wound on the reel structure by turning the handle 19. The reel R can then receive the desired line by leaving the frame forwardly of the reel and securing an end of the desired line to the reel R which is then turned in the usual manner so as to rotate the drum thereof whereupon the line holding member will be turned in the reverse direction.

When it is desired to dry a line which has been in use and which is on the reel R, the drying member 23 is slipped over the end of the line holding member and engaged with the clamping lugs 22. The handle 19 may then be turned in the usual manner and the line L wound upon the drying drum which, as hereinbefore stated, is constructed in a manner to permit free ventilation of the line disposed thereupon while at the same time preventing the line from drying too fast so that the oil inherent in the line will not also dry.

It is, of course, understood that various changes and modifications may be made in the details of construction and design of the above specifically described embodiment of this invention without departing from the spirit thereof, such changes and modifications being restricted only by the scope of the following claims.

The inner disks 10 of the spool are provided with pairs of slots or notches 31 to receive an end of the line L when it has been wound upon the spool. In this manner, the line may be detached from the reel R and the line L will not unwind or otherwise become tangled when mounted on the line holding spool.

What is claimed is:—

1. A device as set forth comprising a frame, a clamping means carried by the frame for detachably mounting the frame on a fishing pole, a shaft secured to the frame, a winding drum including a plurality of spaced plates, and a hollow shaft rotatably engaging said first shaft, a handle secured to an end plate, and means telescoping a portion of said plates and rotatable therewith to hold a line for drying.

2. A device as set forth comprising a frame, a clamping means carried by the frame for detachably mounting the frame on a fishing pole, a shaft fixed to the frame, a hollow shaft rotatably engaging said fixed shaft, a plurality of disks secured to said hollow shaft, one of said disks having outstanding L-shaped lugs disposed in opposed relation on diametrically opposed sides of the axial center of said one disk, a drying reel loosely engageable over certain of said disks, and a bar carried by said reel for engagement with said lugs to detachably hold said reel on said disks.

3. A device as set forth, comprising a winding reel, means for rotatably mounting said winding reel on a fishing pole, a drying reel adapted to telescope said winding reel, a diametrically disposed bar carried by the drying reel, and means carried by the winding reel for engagement with the bar to hold the drying reel against turning relative to the winding reel.

WADSWORTH E. FIELD.